United States Patent
Kenney et al.

(10) Patent No.: US 9,615,291 B2
(45) Date of Patent: *Apr. 4, 2017

(54) HIGH-EFFICIENCY STATION (STA) AND METHOD FOR DECODING AN HE-PPDU

(71) Applicant: Intel IP Corporation, Santa Clara, CA (US)

(72) Inventors: Thomas J. Kenney, Portland, OR (US); Eldad Perahia, Portland, OR (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,405

(22) Filed: Dec. 21, 2015

(65) Prior Publication Data

US 2016/0112899 A1 Apr. 21, 2016

Related U.S. Application Data

(63) Continuation of application No. 14/304,041, filed on Jun. 13, 2014, now Pat. No. 9,271,241.

(Continued)

(51) Int. Cl.
*H04W 4/00* (2009.01)
*H04W 28/06* (2009.01)
(Continued)

(52) U.S. Cl.
CPC .......... *H04W 28/06* (2013.01); *H04B 7/0452* (2013.01); *H04W 16/14* (2013.01);
(Continued)

(58) Field of Classification Search
CPC .......................... H04W 84/12; H04L 27/2602
See application file for complete search history.

(56) References Cited

U.S. PATENT DOCUMENTS 7,809,020 B2  10/2010  Douglas et al.
8,509,323 B2   8/2013  Nangia et al.
(Continued)

FOREIGN PATENT DOCUMENTS

CN  101433018 A  5/2009
CN  105379217 A  3/2016
(Continued)

OTHER PUBLICATIONS

"(Discussion on potential techniques for HEW", IEEE 802.11-13/0871 r0), (Jul. 15, 2013), 13 pgs.
(Continued)

*Primary Examiner* — Kevin C Harper
(74) *Attorney, Agent, or Firm* — Schwegman Lundberg & Woessner, P.A.

(57) ABSTRACT

Embodiments of a system and methods for distinguishing high-efficiency Wi-Fi (HEW) packets from legacy packets are generally described herein. In some embodiments, an access point may select a value for the length field of a legacy signal field (L-SIG) that is non-divisible by three for communicating with HEW stations and may select a value for the length field that is divisible by three for communicating with legacy stations. In some embodiments, the access point may select a phase rotation for application to the BPSK modulation of at least one of the first and second symbols of a subsequent signal field to distinguish a high-throughput (HT) PPDU, a very-high throughput (VHT) PPDU and an HEW PPDU.

28 Claims, 7 Drawing Sheets

Related U.S. Application Data

(60) Provisional application No. 61/991,730, filed on May 12, 2014, provisional application No. 61/986,256, filed on Apr. 30, 2014, provisional application No. 61/986,250, filed on Apr. 30, 2014, provisional application No. 61/976,951, filed on Apr. 8, 2014, provisional application No. 61/973,376, filed on Apr. 1, 2014, provisional application No. 61/906,059, filed on Nov. 19, 2013.

(51) Int. Cl.
*H04W 52/24* (2009.01)
*H04B 7/0452* (2017.01)
*H04W 52/26* (2009.01)
*H04W 16/14* (2009.01)
*H04W 52/42* (2009.01)
*H04W 74/00* (2009.01)
*H04W 84/12* (2009.01)
*H04W 52/34* (2009.01)
*H04W 56/00* (2009.01)

(52) U.S. Cl.
CPC ....... *H04W 52/241* (2013.01); *H04W 52/267* (2013.01); *H04W 52/42* (2013.01); *H04W 74/006* (2013.01); *H04W 52/346* (2013.01); *H04W 56/00* (2013.01); *H04W 84/12* (2013.01)

(56) References Cited

U.S. PATENT DOCUMENTS

| | | | |
|---|---|---|---|
| 9,271,241 B2 | 2/2016 | Kenney et al. | |
| 9,325,463 B2 | 4/2016 | Azizi et al. | |
| 9,450,725 B2 | 9/2016 | Azizi et al. | |
| 9,544,914 B2 | 1/2017 | Azizi et al. | |
| 2004/0146117 A1 | 7/2004 | Subramaniam et al. | |
| 2005/0135410 A1 | 6/2005 | Stephens | |
| 2005/0276347 A1 | 12/2005 | Mujtaba et al. | |
| 2006/0018249 A1 | 1/2006 | Shearer et al. | |
| 2006/0030322 A1 | 2/2006 | Kim et al. | |
| 2006/0062314 A1 | 3/2006 | Palin et al. | |
| 2006/0067415 A1 | 3/2006 | Mujtaba | |
| 2007/0014375 A1 | 1/2007 | Nakao | |
| 2007/0060161 A1 | 3/2007 | Chindapol et al. | |
| 2007/0147226 A1 | 6/2007 | Khandekar et al. | |
| 2007/0147521 A1 | 6/2007 | Horng et al. | |
| 2007/0153929 A1 | 7/2007 | Ballentin et al. | |
| 2008/0013496 A1 | 1/2008 | Dalmases et al. | |
| 2008/0188232 A1 | 8/2008 | Park et al. | |
| 2008/0240018 A1 | 10/2008 | Xue et al. | |
| 2008/0240275 A1 | 10/2008 | Cai | |
| 2009/0122882 A1 | 5/2009 | Mujtaba | |
| 2009/0310692 A1 | 12/2009 | Kafle et al. | |
| 2010/0046671 A1 | 2/2010 | Sadri et al. | |
| 2010/0067480 A1 | 3/2010 | Wang et al. | |
| 2010/0080312 A1 | 4/2010 | Moffatt et al. | |
| 2010/0091673 A1 | 4/2010 | Sawai et al. | |
| 2010/0107042 A1 | 4/2010 | Sawai et al. | |
| 2010/0110804 A1 | 5/2010 | Yeh | |
| 2010/0157956 A1 | 6/2010 | Takahashi | |
| 2010/0157970 A1 | 6/2010 | Gotman et al. | |
| 2010/0220679 A1 | 9/2010 | Abraham et al. | |
| 2010/0260159 A1 | 10/2010 | Zhang et al. | |
| 2010/0322166 A1 | 12/2010 | Sampath et al. | |
| 2011/0013608 A1 | 1/2011 | Lee et al. | |
| 2011/0026623 A1 | 2/2011 | Srinivasa et al. | |
| 2011/0032850 A1 | 2/2011 | Cai | |
| 2011/0038441 A1 | 2/2011 | Shi | |
| 2011/0085513 A1 | 4/2011 | Chen et al. | |
| 2011/0096685 A1 | 4/2011 | Lee et al. | |
| 2011/0116401 A1 | 5/2011 | Banerjea et al. | |
| 2011/0194544 A1 | 8/2011 | Yang et al. | |
| 2011/0206156 A1 | 8/2011 | Lee et al. | |
| 2011/0222486 A1 | 9/2011 | Hart | |
| 2011/0235593 A1 | 9/2011 | Gong et al. | |
| 2011/0249660 A1 | 10/2011 | Noh et al. | |
| 2011/0261708 A1 | 10/2011 | Grandhi | |
| 2011/0261769 A1 | 10/2011 | Ji et al. | |
| 2011/0299474 A1 | 12/2011 | Li et al. | |
| 2011/0305296 A1 | 12/2011 | Van Nee | |
| 2012/0002756 A1 | 1/2012 | Zhang et al. | |
| 2012/0106481 A1 | 5/2012 | Cho et al. | |
| 2012/0155444 A1 | 6/2012 | Chiueh et al. | |
| 2012/0201213 A1 | 8/2012 | Banerjea et al. | |
| 2012/0218983 A1 | 8/2012 | Noh et al. | |
| 2012/0269124 A1 | 10/2012 | Porat | |
| 2012/0275446 A1 | 11/2012 | Stacey et al. | |
| 2012/0314697 A1 | 12/2012 | Noh et al. | |
| 2012/0314786 A1 | 12/2012 | Atungsiri et al. | |
| 2012/0320890 A1 | 12/2012 | Zhang et al. | |
| 2012/0324315 A1 | 12/2012 | Zhang et al. | |
| 2012/0327915 A1 | 12/2012 | Kang et al. | |
| 2013/0070642 A1 | 3/2013 | Kim et al. | |
| 2013/0136075 A1 | 5/2013 | Yu et al. | |
| 2013/0142155 A1 | 6/2013 | Trainin et al. | |
| 2013/0177090 A1 | 7/2013 | Yang et al. | |
| 2013/0230035 A1 | 9/2013 | Grandhi et al. | |
| 2013/0235720 A1 | 9/2013 | Wang et al. | |
| 2013/0258975 A1 | 10/2013 | Krishnamurthy et al. | |
| 2013/0265907 A1 | 10/2013 | Kim et al. | |
| 2013/0286925 A1 | 10/2013 | Fischer et al. | |
| 2013/0286959 A1 | 10/2013 | Lou et al. | |
| 2013/0301551 A1 | 11/2013 | Ghosh et al. | |
| 2013/0301563 A1 | 11/2013 | Gupta et al. | |
| 2014/0010196 A1 | 1/2014 | Shapira | |
| 2014/0016607 A1 | 1/2014 | Hart | |
| 2014/0112274 A1 | 4/2014 | Moon et al. | |
| 2014/0211775 A1 | 7/2014 | Sampath et al. | |
| 2014/0307650 A1 | 10/2014 | Vermani et al. | |
| 2015/0063255 A1 | 3/2015 | Tandra et al. | |
| 2015/0063318 A1 | 3/2015 | Merlin et al. | |
| 2015/0117428 A1 | 4/2015 | Lee et al. | |
| 2015/0131756 A1 | 5/2015 | Suh et al. | |
| 2015/0139090 A1 | 5/2015 | Stephens et al. | |
| 2015/0139091 A1 | 5/2015 | Azizi et al. | |
| 2015/0139118 A1 | 5/2015 | Azizi et al. | |
| 2015/0139119 A1 | 5/2015 | Azizi et al. | |
| 2015/0139205 A1 | 5/2015 | Kenney et al. | |
| 2015/0139206 A1 | 5/2015 | Azizi et al. | |
| 2015/0288489 A1 | 10/2015 | Azizi et al. | |
| 2015/0327121 A1 | 11/2015 | Li et al. | |
| 2016/0211944 A1 | 7/2016 | Kenney et al. | |
| 2016/0211961 A1 | 7/2016 | Azizi et al. | |
| 2016/0242173 A1 | 8/2016 | Li et al. | |
| 2017/0019916 A1 | 1/2017 | Azizi et al. | |

FOREIGN PATENT DOCUMENTS

| | | |
|---|---|---|
| CN | 105659656 A | 6/2016 |
| CN | 105706407 A | 6/2016 |
| CN | 105900511 A | 8/2016 |
| CN | 106100807 A | 11/2016 |
| CN | 106105080 A | 11/2016 |
| EP | 2362580 A2 | 8/2011 |
| EP | 3072254 A1 | 9/2016 |
| EP | 3072270 A1 | 9/2016 |
| EP | 3072324 A1 | 9/2016 |
| EP | 3072347 A1 | 9/2016 |
| JP | 2007074689 A | 3/2007 |
| KR | 1020110044938 A | 5/2011 |
| KR | 1020120127676 A | 11/2012 |
| TW | 201044815 A | 12/2010 |
| TW | 201141288 A | 11/2011 |
| TW | 201234880 A | 8/2012 |
| TW | 201251382 A | 12/2012 |
| TW | 201322786 A | 6/2013 |
| TW | 201349815 A | 12/2013 |
| TW | 201406107 A | 2/2014 |
| TW | 201534073 A | 9/2015 |
| TW | 201534074 A | 9/2015 |
| TW | 201540029 A | 10/2015 |
| TW | 201540118 A | 10/2015 |

(56) References Cited

FOREIGN PATENT DOCUMENTS

| TW | 201541889 A | 11/2015 |
|---|---|---|
| TW | 201541890 A | 11/2015 |
| WO | WO-2005053198 A2 | 6/2005 |
| WO | WO-2011025146 A2 | 3/2011 |
| WO | WO-2011068387 A2 | 6/2011 |
| WO | WO-2012057547 A2 | 5/2012 |
| WO | WO-2012106635 A1 | 8/2012 |
| WO | WO-2013055117 A2 | 4/2013 |
| WO | WO-2013058512 A1 | 4/2013 |
| WO | WO-2013077653 A1 | 5/2013 |
| WO | WO-2013089404 A1 | 6/2013 |
| WO | WO-2014066785 A1 | 5/2014 |
| WO | WO-2015076917 A1 | 5/2015 |
| WO | WO-2015076923 A1 | 5/2015 |
| WO | WO-2015076932 A1 | 5/2015 |
| WO | WO-2015077040 A1 | 5/2015 |
| WO | WO-2015077042 A1 | 5/2015 |
| WO | WO-2015077049 A1 | 5/2015 |
| WO | WO-2015077056 A1 | 5/2015 |
| WO | WO-2015077068 A1 | 5/2015 |
| WO | WO-2015077096 A1 | 5/2015 |
| WO | WO-2015077223 A1 | 5/2015 |
| WO | WO-2015130335 A1 | 9/2015 |
| WO | WO-2015130341 A1 | 9/2015 |
| WO | WO-2015171243 A1 | 11/2015 |

OTHER PUBLICATIONS

"11ah Preamble for 2Mhz and Beyond", IEEE Submission No. IEEE 802.1-11/1483r2, 1-24.
"U.S. Appl. No. 14/304,041, Notice of Allowance mailed Oct. 8, 2015", 8 pgs.
"U.S. Appl. No. 14/304,041, Supplemental Notice of Allowability mailed Nov. 4, 2015", 5 pgs.
"U.S. Appl. No. 14/315,562, Non Final Office Action mailed Sep. 25, 2015", 14 pgs.
"U.S. Appl. No. 14/338,137, Notice of Allowance mailed Nov. 25, 2015", 14 pgs.
"U.S. Appl. No. 14/458,000, Non Final Office Action mailed Dec. 3, 2015", 16 pgs.
"Guard interval estimation considering switch time and propagation delay", R1-134362, 3GPP TSG RAN WG1 Meeting #74bis, (Oct. 2013).
"International Application Serial No. PCT/US2014/044881, International Search Report mailed Nov. 24, 2014", 3 pgs.
"International Application Serial No. PCT/US2014/044881, Written Opinion mailed Nov. Nov. 24, 2014", 7 pgs.
"International Application Serial No. PCT/US2014/053451, International Search Report mailed Dec. 10, 2014", 3 pgs.
"International Application Serial No. PCT/US2014/053451, Written Opinion mailed Dec. 10, 2014", 4 pgs.
"International Application Serial No. PCT/US2014/055996, International Search Report mailed Dec. 17, 2014", 3 pgs.
"International Application Serial No. PCT/US2014/055996, Written Opinion mailed Dec. 17, 2014", 5 pgs.
"International Application Serial No. PCT/US2014/056819, International Search Report mailed Dec. 31, 2014", 3 pgs.
"International Application Serial No. PCT/US2014/056819, Written Opinion mailed Dec. 31, 2014", 6 Pgs.
"International Application Serial No. PCT/US2014/057751, International Search Report mailed Jan. 5, 2015", 3 pgs.
"International Application Serial No. PCT/US2014/057751, Written Opinion mailed Jan. 5, 2015", 5 pgs.
"International Application Serial No. PCT/US2014/064340, International Search Report mailed Feb. 16, 2015", 3 pgs.
"International Application Serial No. PCT/US2014/064340, Written Opinion mailed Feb. 16, 2015", 6 pgs.
"International Application Serial No. PCT/US2014/064350, International Search Report mailed Feb. 6, 2015", 4 pgs.
"International Application Serial No. PCT/US2014/064350, Written Opinion mailed Feb. 6, 2015", 5 pgs.
"International Application Serial No. PCT/US2014/064509, International Search Report mailed Feb. 11, 2015", 3 pgs.
"International Application Serial No. PCT/US2014/064509, Written Opinion mailed Feb. 11, 2015", 8 pgs.
"International Application Serial No. PCT/US2014/064599, International Search Report mailed Feb. 26, 2015", 3 pgs.
"International Application Serial No. PCT/US2014/064599, Written Opinion mailed Feb. 26, 2015", 7 pgs.
"International Application Serial No. PCT/US2014/064767, International Search Report mailed Feb. 26, 2015", 8 pgs.
"International Application Serial No. PCT/US2014/064767, Written Opinion mailed Feb. 26, 2015", 8 pgs.
"International Application Serial No. PCT/US2014/065166, International Search Report mailed Jan. 22, 2015", 3 pgs.
"International Application Serial No. PCT/US2014/065166, Written Opinion mailed Jan. 22, 2015", 6 pgs.
"International Application Serial No. PCT/US2014/066133, International Search Report mailed Feb. 24, 2015", 3 pgs.
"International Application Serial No. PCT/US2014/066133, Written Opinion mailed Feb. 24, 2015", 7 pgs.
"International Application Serial No. PCT/US2014/071942, International Search Report mailed Apr. 17, 2015", 3 pgs.
"International Application Serial No. PCT/US2014/071942, Written Opinion mailed Apr. 17, 2015", 7 pgs.
"International Application Serial No. PCT/US2015/024889, International Search Report mailed Jun. 29, 2015", 3 pgs.
"International Application Serial No. PCT/US2015/024889, Written Opinion mailed Jun. 29, 2015", 11pgs.
"International Application Serial No. PCT/US2015/035114, International Search Report mailed Oct. 19, 2015", 3 pgs.
"International Application Serial No. PCT/US2015/035114, Written Opinion mailed Oct. 19, 2015", 8 pgs.
"International Application Serial No. PCT/US2015/035313, International Search Report mailed Sep. 25, 2015", 4 pgs.
"International Application Serial No. PCT/US2015/035313, Written Opinion mailed Sep. 25, 2015", 8 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Choi, Jinsoo, "Discussion on OFDMA in HEW", In: IEEE P802.11—High Efficiency WLAN Study Group, (Nov. 11, 2013), 11 pgs.
Chun, Jinyoung, et al., "Legacy Support on HEW frame structure", IEEE 11-13/1057r0, (Sep. 16, 2013), 8 pgs.
Chun, Jinyoung, et al., "Uplink multi-user transmission", In: IEEE P802.11—High Efficiency WLAN Study Group, (Nov. 11, 2013), 18 pgs.
Hiertz, Guido R, et al., "Proposed direction and priorities for HEW", In: IEEE P802.11—High Efficiency WLAN Study Group, (Nov. 12, 2013), 17 pgs.
Katsuo, Yunoki, et al., "Access Control Enhancement", doc.:IEEE II-13/1073r1, [Online]. Retrieved from the Internet: <https://mentor.ieee.org/802.11/documents?is_dcn=1073>, (Sep. 18, 2013), 1-9.
Koskela, Timo, et al., "Discussion on Potential Techniques for HEW", In: IEEE P802.11—High Efficiency WLAN Study Group, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
"U.S. Appl. No. 14/338,137, Corrected Notice of Allowance mailed Jan. 22, 2016", 10 pgs.
"U.S. Appl. No. 14/447,254, Non Final Office Action mailed Mar. 31, 2016", 13 pgs.
"U.S. Appl. No. 14/458,000, Final Office Action mailed May 9, 2016", 11 pgs.
"U.S. Appl. No. 14/458,000, Response filed Mar. 3, 2015 to Non Final Office Action mailed Dec. 3, 2015", 15 pgs.
"U.S. Appl. No. 15/052,600, Corrected Notice of Allowance mailed Jun. 24, 2016", 7 pgs.

(56) References Cited

OTHER PUBLICATIONS

"U.S. Appl. No. 15/052,600, Notice of Allowance mailed May 20, 2016", 10 pgs.
"U.S. Appl. No. 15/052,600, Preliminary Amendment filed Apr. 1, 2016", 10 pgs.
"International Application Serial No. PCT/US2014/055996, International Preliminary Report on Patentability mailed Jun. 2, 2016", 7 pgs.
"International Application Serial No. PCT/US2014/056819, International Preliminary Report on Patentability mailed Jun. 2, 2016", 8 pgs.
"International Application Serial No. PCT/US2014/064350, International Preliminary Report on Patentability mailed Jun. 2, 2016", 7 pgs.
"International Application Serial No. PCT/US2014/064509, International Preliminary Report on Patentability mailed Jun. 2, 2016", 10 pgs.
"International Application Serial No. PCT/US2014/064599, International Preliminary Report on Patentability mailed Jun. 2, 2016", 9 pgs.
"International Application Serial No. PCT/US2014/065166, International Preliminary Report on Patentability mailed Jun. 2, 2016", 8 pgs.
"Taiwanese Application Serial No. 104106272, Office Action mailed Apr. 18, 2016", w/ English Claims, 15 pgs.
"Taiwanese Application Serial No. 104106275, Office Action mailed Jun. 8, 2016", 3 pgs.
"Taiwanese Application Serial No. 104108803, Office Action mailed Jul. 1, 2016", 4 pgs.
"Taiwanese Application Serial No. 104108807, Office Action mailed May 26, 2016", W/ English Search Report, 10 pgs.
U.S. Appl. No. 15/023,262, filed Mar. 18, 2016, Master Station and Method for HEW Communication With Signal Field Configuration for HEW OFDMA MU-MIMO Wideband Channel Operation.
U.S. Appl. No. 15/023,581, filed Mar. 21, 2016, Communication Station and Method for Communicating Using Minimum Bandwidth Units of Various Tone Allocations for OFDMA HEW.
"Taiwanese Apoiication Serial No. 105113980, Office Action mailed Jul. 21, 2016", W/ English Claims, 18 pgs.
"European Application Serial No. 16168650.6, Extended European Search Report mailed Sep. 7, 2016", 12 pgs.
"Indian Application Serial No. 201647013626, Voluntary Amendment filed Aug. 4, 2016", W/ English Translation, 15 pgs.
11ah Preamble for 2Mhz and Beyond, IEEE Submission No. IEEE 802.1-11/1483r2, 1-24.
"U.S. Appl. No. 14/447,254, Examiner Interview Summary mailed Jul. 22, 2016", 4 pgs.
"U.S. Appl. No. 14/447,254, Final Office Action mailed Sep. 14, 2016", 13 pgs.
"U.S. Appl. No. 14/447,254, Response filed Aug. 1, 2016 to Non Final Office Action mailed Mar. 31, 2016", 12 pgs.
"U.S. Appl. No. 14/458,000, Notice of Allowance mailed Aug. 24, 2016", 11 pgs.
"U.S. Appl. No. 14/458,000, Response filed Aug. 8, 2016 to Final Office Action mailed May 9, 2016", 12 pgs.
"Application Serial No. 15/052,600, Corrected Notice of Allowance mailed Aug. 5, 2016", 7 pgs.
U.S. Appl. No. 15/263,864, filed Sep. 13, 2016, Wireless Apparatus for High-Efficiency (HE) Communication With Additional Subcarriers.
U.S. Appl. No. 15/280,782, filed Sep. 29, 2016, Master Station and Method for HEW Communication Using a Transmission Signaling Structure for a HEW Signal Field.
"Taiwanese Application Serial No. 104106272, Response filed Oct. 14, 2016 to Office Action mailed Apr. 18, 2016", W/ English Claims, 45 pgs.
"Taiwanese Application Serial No. 104108807, Response filed Nov. 25, 2016 Office Action mailed May 26, 2016", W/ English Claims, 65 pgs.
"Taiwanese Application Serial No. 105113980, Response filed Oct. 24, 2016 to Office Action mailed Jul. 21, 2016", W/ English Claims, 80 pgs.
"U.S. Appl. No. 14/447,254, Advisory Action mailed Feb. 13, 2017", 4 pgs.
"U.S. Appl. No. 14/447,254, Examiner Interview Summary mailed Jan. 18, 2017", 3 pgs.
"U.S. Appl. No. 14/447,254, Response filed Jan. 17, 2017 Final Office Action mailed Sep. 14, 2016", 11 pgs.
"U.S. Appl. No. 15/023,581, Non Final Office Action mailed Jan. 17, 2017", 10 pgs.
"European Application Serial No. 14863362.1, Response filed Dec. 20, 2016 to Communication pursuant to Rules 161(2) and 162 EPC mailed Jun. 28, 2016", 21 pgs.
"European Application Serial No. 14864664.9, Response filed Dec. 22, 2016 to Communication pursuant to Rules 161(2) and 162 EPC mailed Jun. 28, 2016", 4 pgs.

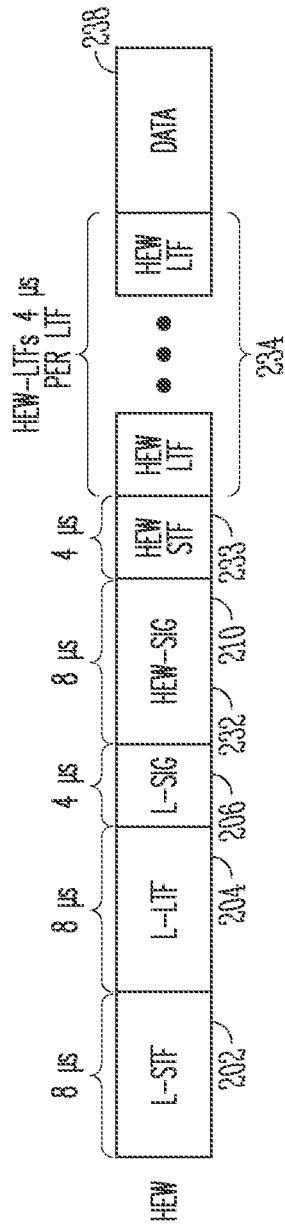
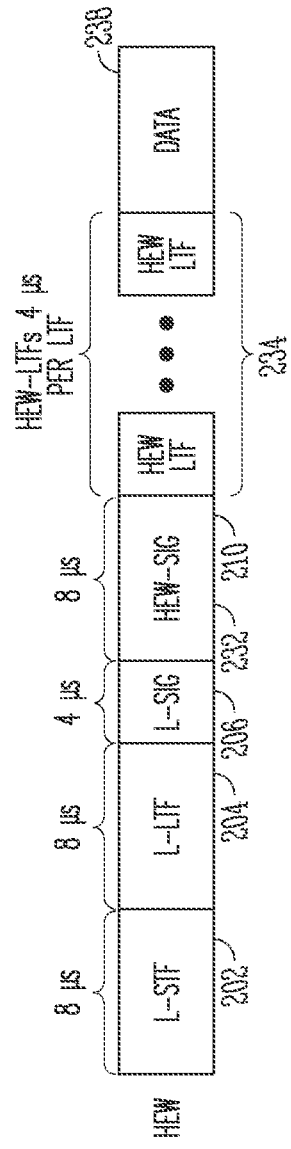
FIG. 2F
FIG. 2G

HIGH-EFFICIENCY STATION (STA) AND METHOD FOR DECODING AN HE-PPDU

PRIORITY CLAIM

This application is a continuation of U.S. patent application Ser. No. 14/304,041, filed Jun. 13, 2014, which claims priority under 35 U.S.C. 119(e) to U.S. Provisional Patent Application Ser. No. 61/906,059, filed Nov. 19, 2013, U.S. Provisional Patent Application Ser. No. 61/973,376, filed Apr. 1, 2014, U.S. Provisional Patent Application Ser. No. 61/976, filed Apr. 8, 2014, U.S. Provisional Patent Application Ser. No. 61/986,256, filed Apr. 30, 2014, U.S. Provisional Patent Application Ser. No. 61/986,250, filed Apr. 30, 2014, and to U.S. Provisional Patent Application Ser. No. 61/991,730, filed May 12, 2014, each of which is incorporated herein by reference in its entirety.

TECHNICAL FIELD

Embodiments pertain to wireless networks. Some embodiments relate to Wi-Fi networks and networks operating in accordance with the IEEE 802.11 standards. Some embodiments relate to high-efficiency wireless or high-efficiency Wi-Fi (HEW) communications in accordance with the IEEE 802.11ax draft standard.

BACKGROUND

IEEE 802.11ax (High Efficiency Wi-Fi (HEW)) is the successor to IEEE 802.11ac standard and is intended to increase the efficiency of wireless local-area networks (WLANs). HEW's goal is to provide up to four-times or more the throughput of IEEE 802.11ac standard. HEW may be particularly suitable in high-density hotspot and cellular offloading scenarios with many devices competing for the wireless medium may have low to moderate data rate requirements. The Wi-Fi standards have evolved from IEEE 802.11b to IEEE 802.11g/a to IEEE 802.11n to IEEE 802.11ac and now to IEEE 802.11ax. In each evolution of these standards, there were mechanisms to afford coexistence with the previous standard. For HEW, the same requirement exists for coexistence with legacy devices and systems.

Thus there are general needs for systems and methods that that allow HEW devices to coexist with legacy devices that operate in accordance with prior versions of the standards. There are general needs for systems and methods that that allow HEW communications to be distinguished from legacy communications and provide coexistence with legacy devices and systems.

BRIEF DESCRIPTION OF THE DRAWINGS

FIG. 2F illustrates a HEW format PPDU for multi-stream transmissions with transmit beamforming in accordance with some alternate embodiments;

FIG. 2G illustrates a HEW format PPDU for multi-stream transmissions without transmit beamforming in accordance with some embodiments;

DETAILED DESCRIPTION

Figure 1:
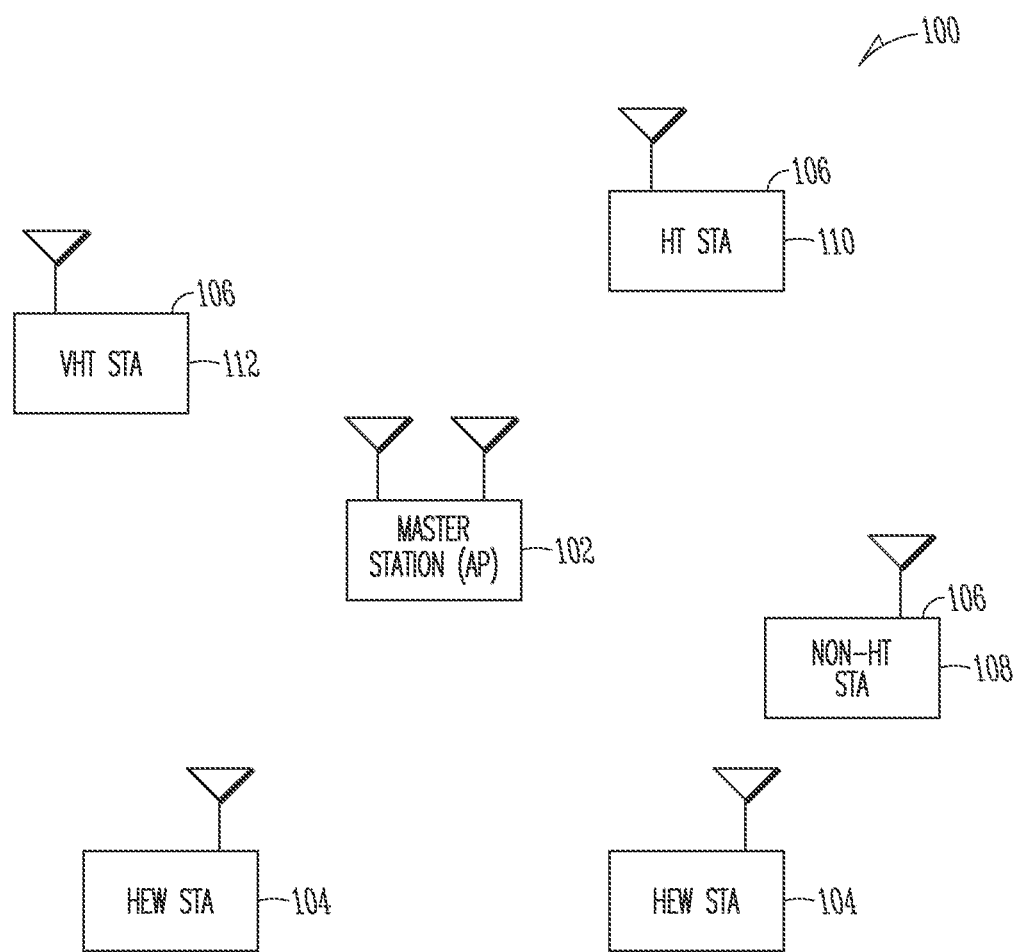
FIG. 1 illustrates a wireless network in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein provide for coexistence of High Efficiency Wi-Fi (HEW) devices with existing legacy Wi-Fi devices. Legacy devices may refer to devices operating in accordance with previous Wi-Fi standards and/or amendments such as IEEE 802.11g/a, IEEE 802.11n or IEEE 802.11ac. HEW is a recent activity in IEEE to evolve the Wi-Fi standard. It has several target use cases, with a large focus on improving system efficiency in dense deployed networks. Since it is an evolution of the previous standards and needs to coexist with the legacy systems, a technique to identify each transmission as either a HEW packet or a legacy packet is needed. Additionally, it would be advantageous if the technique to identify the HEW transmissions could at the same time defer legacy devices. Finally, since one focus on HEW is efficiency, another aspect is to have a mechanism which accomplishes these things without adding any additional overhead to each transmission and possibly reducing the overhead.

Embodiments disclosed herein provide techniques to notify HEW devices that an HEW compliant transmission is occurring while also deferring legacy devices and doing so with little or no additional overhead from what is done in legacy transmissions and in some embodiments, less overhead. Since HEW is an evolution of the existing Wi-Fi standards, there have not been any previous solutions to address this need.

In some embodiments, the preamble portion of the packet has been increased and new fields added with various modulation formats so that the new releases could be identified. Some embodiments described herein are configured to defer legacy devices using the legacy signal field (L-SIG) and build upon the coexistence approach adopted in IEEE 802.11n and IEEE 802.11ac. In those systems, the rate field of the L-SIG was fixed to a set known value and the length was set to a length that would defer those devices beyond the transmission of an IEEE 802.11n or an IEEE 802.11ac transmission.

In some embodiments disclosed herein, the same fixed value in the rate field may be used although this is not a requirement. In some embodiments, the length field of the L-SIG may be computed differently from what is done in an IEEE 802.11n/ac system to allow deferral of legacy systems and identification of an HEW transmission. These embodiments are described in more detail below.

Following the L-SIG in an IEEE 802.11n/ac transmission are additional SIG fields. In IEEE 802.11n/ac systems, these SIG fields follow directly after the L-SIG and are phase rotated in order to allow identification. In the embodiments disclosed herein, an HEW signal field may also be used if needed and may use a modified legacy length value allowing for several preamble designs and potentially several payloads to support not only single user (SU) packets to multi-user (MU) packets like multi-user multiple-input multiple-output (MU-MIMO) or orthogonal frequency division multiple access (OFDMA). In these embodiments that use uplink MU-MIMO or uplink OFDMA, an access point (AP) may operate as a master station which would have mechanisms to contend and hold the medium. Uplink transmissions from scheduled HEW stations may immediately follow. In those cases, the AP may signal the specific devices that are targeted for uplink transmission the transmission parameters. Therefore, each device that transmits in the uplink would not need to send any additional configuration parameters and therefore does not need an additional SIG field in the preamble during their transmission.

Embodiments disclosed herein also allow legacy devices that missed the initial AP transmission (e.g., when returning from a power save mode) to detect the signal and properly defer irrespective of them being an IEEE 802.11a, an IEEE 802.11n or an IEEE 802.11ac device. In these embodiments, a new signal field modulation format is disclosed in which the first symbol is set as rotated BPSK (i.e., rotated by 90 degrees) and then the second would be BPSK (i.e., not rotated). These embodiments are described in more detail below.

FIG. 1 illustrates a wireless network in accordance with some embodiments. Wireless network 100 may include a master station (STA) 102, a plurality of HEW stations 104 (i.e., HEW devices), and a plurality of legacy stations 106 (legacy devices). The master station 102 may be arranged to communicate with the HEW stations 104 and the legacy stations 106 in accordance with one or more of the IEEE 802.11 standards. In some embodiments, the master station 102 may be an access point (AP), although the scope of the embodiments is not limited in this respect.

Legacy stations 106 may include, for example, non-HT stations 108 (e.g., IEEE 802.11a/g stations), HT stations 110 (e.g., IEEE 802.11n stations), and VHT stations 112 (e.g., IEEE 802.11ac stations). Embodiments disclosed herein allow HEW stations 104 to distinguish transmissions (e.g., packets such as packet protocol data units (PPDUs)) from transmissions of legacy stations 106 and cause legacy stations 106 to at least defer their transmissions during HEW transmissions providing backwards compatibility. In some embodiments, the length field of the legacy signal field (L-SIG) may be used to cause some legacy stations 106 to defer transmissions. In some embodiments, the length field of the L-SIG may be used to distinguish HEW PPDUs from non-HEW PPDUs. In some embodiments, a phase rotation applied to a subsequent or additional signal field (an HT-SIG, a VHT SIG or an HEW SIG) may be used to distinguish HT PPDUs, VHT PPDUs and HEW PPDUs. In some embodiments, the rate field of the L-SIG may be used to cause some legacy stations 106 to defer transmissions and distinguish non-HT transmissions from HT, VHT and HEW transmissions. These embodiments are discussed in more detail below.

In accordance with embodiments, the master station 102 may include hardware processing circuitry including physical layer (PHY) and medium-access control layer (MAC) circuitry which may be arranged to contend for a wireless medium (e.g., during a contention period) to receive exclusive control of the medium for an HEW control period (i.e., a transmission opportunity (TXOP)). The master station 102 may transmit an HEW master-sync transmission at the beginning of the HEW control period. During the HEW control period, the HEW stations 104 may communicate with the master station 102 in accordance with a non-contention based multiple-access technique (e.g., an OFDMA technique or MU-MIMO technique). This is unlike conventional Wi-Fi communications in which devices communicate in accordance with a contention-based communication technique, rather than a non-contention multiple-access technique. During the HEW control period, legacy stations 106 refrain from communicating and defer their transmissions. In some embodiments, the HEW master-sync transmission may be referred to as an HEW control and schedule transmission.

In accordance with some embodiments, the master-sync transmission may include a multi-device HEW preamble arranged to signal and identify data fields for a plurality of scheduled HEW stations 104. The master station 102 may further be arranged to transmit (in the downlink direction) and/or receive (in the uplink direction) one or more of the data fields to/from the scheduled HEW stations 104 during the HEW control period. In these embodiments, the master station 102 may include training fields in the multi-device HEW preamble to allow each of the scheduled HEW stations 104 to perform an initial channel estimate.

In accordance with some embodiments, an HEW station 104 may be an IEEE 802.11ax configured station (STA) that is configured for HEW operation. An HEW station 104 may be configured to communicate with a master station 102 in accordance with a scheduled multiple access technique during the HEW control period and may be configured to receive and decode the multi-device HEW preamble of an HEW frame or PPDU. An HEW station 104 may also be configured to decode an indicated data field received by the master station 102 during the HEW control period. Examples of HEW PPDUs are illustrated in FIGS. 2D through 2G discussed below.

In accordance with some embodiments, the master station 102 may be arranged to select a number of HEW long-training fields (LTFs) to be included in the multi-device HEW preamble of an HEW frame. The HEW frame may comprise a plurality of links for transmission of a plurality of data streams. The master station 102 may also transmit the selected number of LTFs sequentially as part of the multi-device HEW preamble. The master station 102 may also transmit/receive a plurality of data fields sequentially to/from each of a plurality of scheduled HEW stations 104. The data fields may be part of the HEW frame. Each data field may correspond to one of the links and may comprise one or more data streams. In some embodiments, the data fields may be separate packets. The master station 102 may also be arranged receive packets from HEW stations 104 in the uplink direction during the HEW control period.

In some embodiments, the selection of the number of LTFs to be included in the multi-device HEW preamble may be based on a maximum number of streams to be transmitted on a single link. In some embodiments, the selection of the number of LTFs to be included in the multi-device HEW preamble may be based on a scheduled HEW station 104 with a greatest channel estimation need (e.g., the scheduled HEW station 104 receiving the greatest number of streams on a single link). In some embodiments, the selection of the number of LTFs to be included in the multi-device HEW preamble may be based on the sum of greatest number of streams on each single link that scheduled HEW stations 104 would receive. In some embodiments, the number of LTFs to be included in the multi-device HEW preamble may be predetermined. In these embodiments, the number of LTFs to be included in the multi-device HEW preamble may be based on the maximum number of streams that can be transmitted on a single link.

In some embodiments, the master station 102 may be arranged to configure the multi-device HEW preamble include an HEW control signal field (i.e., HEW SIG-B) to identify and signal each of the data fields of the HEW frame. In these embodiments, a single HEW preamble is included in an HEW frame, which is unlike conventional techniques which include a preamble for each link.

Figure 2A:
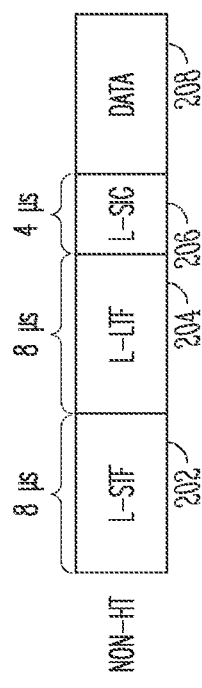
FIG. 2A illustrates a non-HT (high-throughput) format packet protocol data unit (PPDU) in accordance with some embodiments.

FIG. 2A illustrates a non-HT format PPDU in accordance with some embodiments. The non-HT format PPDU may be used for communicating with non-HT stations 108 (FIG. 1), which may include stations configured to communicate in accordance with an IEEE 802.11a or IEEE 802.11g standard. In IEEE 802.11a/g, the packet structure comprises a Legacy Short Training Field (L-STF) 202, a Legacy Long Training Field (L-LTF) 204 and the L-SIG 206 which made up the preamble. The preamble is followed by a data field 208. The L-SIG 206 provides information about the data field 208 including the coding and modulation (rate) and the length.

Figure 2B:
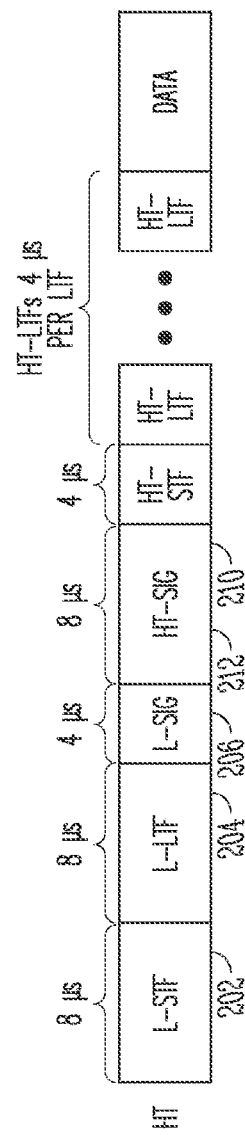
FIG. 2B illustrates a HT mixed-format PPDU in accordance with some embodiments.

FIG. 2B illustrates a HT mixed-format PPDU in accordance with some embodiments. The HT mixed-format PPDU may be used for communicating with HT stations 110 (FIG. 1), which may include stations configured to communicate in accordance with an IEEE 802.11n standard. In IEEE 802.11n, the packet structure allows the IEEE 802.11n devices to coexist with IEEE 802.11a/g devices and therefore included the legacy preamble portion of the packet to be used at the beginning of the transmission. The IEEE 802.11n transmission sets the rate field of the L-SIG 206 to a fixed rate and the length field is set to extend for the full duration of the IEEE 802.11n packet. Following the legacy portion of the preamble, the IEEE 802.11n preamble includes a HT-SIG 212 for the IEEE 802.11n and includes additional configuration information for those devices. The HT-SIG 212 uses rotated binary phase-shift keying (BPSK) in both symbols of the HT-SIG 212 so that IEEE 802.11n devices can distinguish it from non-rotated BPSK data 208 of an IEEE 802.11a/g transmission and allows those devices to detect the existence of an IEEE 802.11n packet. Thus, IEEE 802.11a/g devices are able to recognize the legacy portion of the preamble, but not the portion following the legacy portion and may defer based on the configuration parameters in the L-SIG 206 of the HT mixed-format PPDU of FIG. 2B assuring coexistence.

Figure 2C:
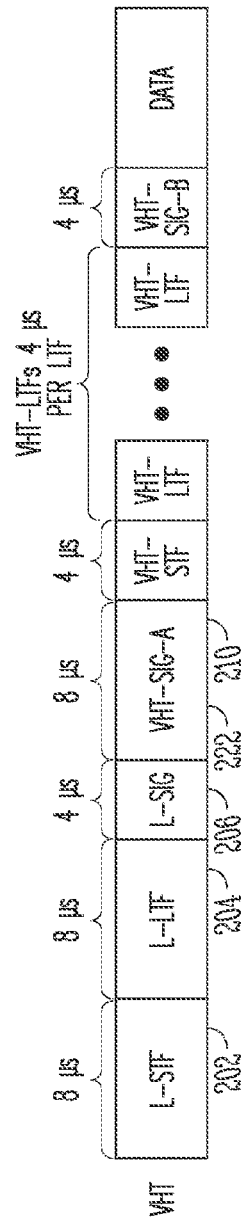
FIG. 2C illustrates a VHT (very-high throughput) format PPDU in accordance with some embodiments.

FIG. 2C illustrates a VHT format PPDU in accordance with some embodiments. The VHT format PPDU may be used for communicating with VHT stations 112 (FIG. 1), which may include stations configured to communicate in accordance with an IEEE 802.11ac standard. In 802.11ac, the packet also starts with the legacy portion of the preamble which is then followed by a VHT-SIG 222 to provide additional configuration parameters for the VHT data field. The IEEE 802.11a/g devices recognize the legacy portion of the packet but would decode the rest of the packet correctly and thus defer from transmission for the full length based on the legacy rate/length fields.

IEEE 802.11ac devices are also able to discern IEEE 802.11ac packets from other legacy (IEEE 802.11a/g and IEEE 802.11n) packets. In the discussion above regarding IEEE 802.11n, the HT-SIG field 212 (FIG. 2B) following the L-SIG 206 is modulated using BPSK as in the L-SIG 206, but it is rotated 90 degrees. This modulation format may be used by an IEEE 802.11n device to detect those packets and identify them as IEEE 802.11n packets. For IEEE 802.11ac devices to detect IEEE 802.11ac packets, the VHT-SIG 222 (FIG. 2C) is normal BPSK for the first symbol of the VHT-SIG 222 and is rotated 90 degrees for the second symbol. This allows for the identification of IEEE 802.11ac packets by IEEE 802.11ac devices, but demodulation of the VHT-SIG 222 may not be possible by the IEEE 802.11n devices. In those cases the IEEE 802.11n device will defer based on the L-SIG 206.

FIGS. 2D-2G illustrate HEW format PPDUs in accordance with various embodiments. The HEW formats PPDU of FIGS. 2D-2G may be used for communicating with HEW stations 104 (FIG. 1), which may include stations configured to communicate in accordance with an IEEE 802.11x standard. In accordance with embodiments, the master station 102 (FIG. 1) may configure a PPDU comprising a legacy signal field (L-SIG) 206 following legacy training fields (i.e., L-STF 202 and L-LTF 204).

In some embodiments, the L-SIG 206 may be configured to include at least a length field and a rate field. The master station 102 may select a value for the length field that is non-divisible by three for communicating with the HEW stations 104 and may select a value for the length field that is divisible by three for communicating with at least some legacy stations 106. In these embodiments, when the length field is not divisible by three, at least some legacy stations 106 (i.e., HT stations 110 and VHT stations 112) would determine that the length field value in the L-SIG 206 is invalid and will properly defer their transmissions. When the length field is not divisible by three, HEW stations 104 may be configured to identify the PPDU as an HEW PPDU and decode one or more of the fields that follow the L-SIG 206.

In some embodiments, the master station 102 is further arranged to configure the L-SIG 206 with a valid parity bit (i.e., the L-SIG parity bit) when the length field is selected to be divisible by three and when the length field is selected to be non-divisible by three. In these embodiments, the L-SIG may always be configured with a valid parity bit. In these embodiments, when a valid L-SIG parity bit is indicated, the physical layer (PHY) of a device may maintain a busy indication for the predicted duration of the PPDU. Thus legacy stations 106 will defer for the value indicated by the length (L_LENGTH) field in the L-SIG 206 even if the value is invalid (i.e., not divisible by three) as long as the parity bit is valid.

In some embodiments, the master station 102 may multiply a ceiling function by three and subtract either two or one to calculate the value for the length field for the HEW PPDUs. By multiplying the ceiling function by three and then subtracting two or one assures that the length field is not divisible by three. The master station 102 may multiply the ceiling function by three and subtract three to calculate the value for the length field for HT and VHT PPDUs. By multiplying the ceiling function by three and then subtracting three assures that the length field is divisible by three. These embodiments are discussed in more detail below.

In some embodiments, the length calculation used to populate the L-SIG for .11ac packets is give as (L_LENGTH):

$$TXTIME \text{ (for } SGI) = T_{LEG\_PREAMBLE} + T_{L-SIG} + T_{VHT-SIG-A} +$$
$$T_{VHT\_PREAMBLE} + T_{VHT-SIG-B} + T_{SYM} \times \left\lceil \frac{T_{SYMS} \times N_{SYM}}{T_{SYM}} \right\rceil$$
$$L\_LENGTH = \left\lceil \frac{TXTIME - 20}{4} \right\rceil \times 3 - 3$$

In the above equations, the T variable is the time for the respective portions of the packet and variables $T_{SYMS}$, $T_{SYM}$ and $N_{SYM}$ represent the short GI symbol interval, symbol interval and number of symbols in a packet respectively. The equation in the L_LENGTH calculation uses a ceiling function multiplied by three and then three is subtracted. For any value of TXTIME, the L_LENGTH will be divisible by three. Thus, for HEW packets, embodiments disclosed herein may set the L_LENGTH to a value that is not divisible by three. In some embodiments, the expression for L_LENGTH for HEW packets may be:

$$L_{LENGTH} = \left\lceil \frac{TXTIME - 20}{4} \right\rceil \times 3 - 2$$

This would result in a length that is one larger than before but is not divisible by three. Doing this may be sufficient to identify HEW packets and may allow coexistence with legacy (IEEE 802.11a/g/n/ac) devices. Legacy stations 106 would decode the L-SIG, and defer for a time based on the L_LENGTH value regardless of the value.

In these embodiments, no additional signaling or other metrics need to be added in order to identify HEW packets. That is very appealing in HEW where efficiency is a key design parameter. Additionally, for techniques like uplink MU-MIMO and OFDMA to be efficient a very short preamble is desirable. These embodiments are very efficient with no overhead and provide full coexistence with legacy systems.

In some embodiments, the master station 102 may be arranged to configure the PPDU to include a subsequent/additional signal field 210 (e.g., HT-SIG 212, VHT-SIG 222, or HEW-SIG 232) following the L-SIG 206. The subsequent signal field 210 may have first and second symbols that are BPSK modulated. In these embodiments, the master station 102 may select a phase rotation for application to the BPSK modulation of at least one of the first and second symbols of the subsequent signal field 210 to distinguish a HT PPDU (FIG. 2B), a VHT PPDU (FIG. 2C) and an HEW PPDU (FIGS. 2D-2G). These embodiments are discussed in more detail below.

In some embodiments, for communicating with HEW stations 104, the master station 102 may configure the PPDU to include a number of long-training fields (LTFs) 234 to be included in a multi-device HEW preamble the PPDU. The number of LTFs 234 may be based on a maximum number of streams communicated over a link. The master station 102 may contend for a wireless medium during a contention period to receive control of the medium for an HEW control period (i.e., a TXOP) and may transmit the PPDU during the HEW control period. During the HEW control period, the master station 102 may operate as a master station having exclusive use of the wireless medium for communication of data with a plurality of scheduled HEW stations 104 in accordance with a non-contention based scheduled OFDMA technique in accordance with signaling information indicated in an HEW signal field. The scheduled OFDMA technique may, for example, be an uplink (UL) OFDMA technique, a downlink (DL) OFDMA technique or an UL or DL multi-user multiple-input multiple-output (MU-MIMO) technique.

In some embodiments, for an HEW PPDU, each data field may be associated with either a single user (SU) link or a multi-user (MU) link and each link may be configurable to provide multiple streams of data. The links of the HEW PPDU may be configurable to have a bandwidth of one of 20 MHz, 40 MHz, 80 MHz or 160 MHz.

Figure 2D:
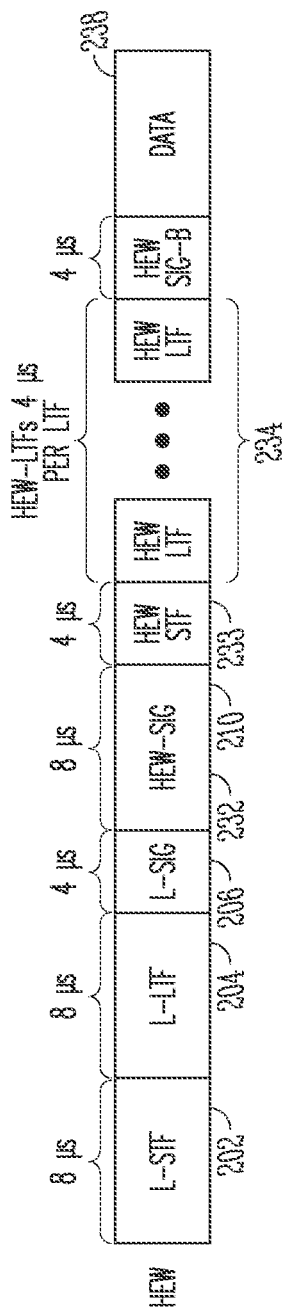
FIG. 2D illustrates a HEW format PPDU in accordance with some embodiments.
Figure 2E:
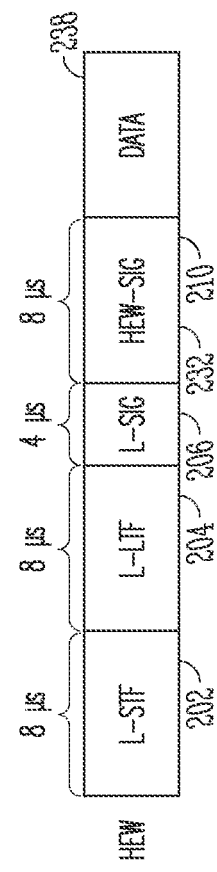
FIG. 2E illustrates a HEW format PPDU for single-stream transmissions in accordance with some embodiments.

FIG. 2E illustrates a HEW format PPDU for single-stream transmissions in accordance with some embodiments. In these embodiments, all signaling information for transmission of a single stream over a link may be included within the HEW-SIG 232 eliminating the need for one or more HEW LTFs and an HEW SIG B field. The multi-stream HEW format PPDU of FIG. 2D, on the other hand includes a number of LTFs 234 based on a maximum number of streams communicated over a link and an HEW SIG-B field.

FIG. 2F illustrates a HEW format PPDU for multi-stream transmissions with transmit beamforming in accordance with some embodiments. In these embodiments, the signaling information from the HEW-SIG-B field may be included within the HEW-SIG 232 eliminating the need for a second signal field (e.g., an HEW SIG B field). In these embodiments, the number of HEW LTFs 234 may be based on a maximum number of streams communicated over the link and an HEW STF 233 may be included for transmit beamforming.

FIG. 2G illustrates a HEW format PPDU for multi-stream transmissions without transmit beamforming in accordance with some embodiments. In these embodiments, the signaling information from the HEW-SIG-B field may be included within the HEW-SIG 232 eliminating the need for a second signal field (e.g., an HEW SIG B field). In these embodiments, the number of HEW LTFs 234 may be based on a maximum number of streams communicated over the link and an HEW STF may not be needed since transmit beamforming is not performed.

Figure 3:
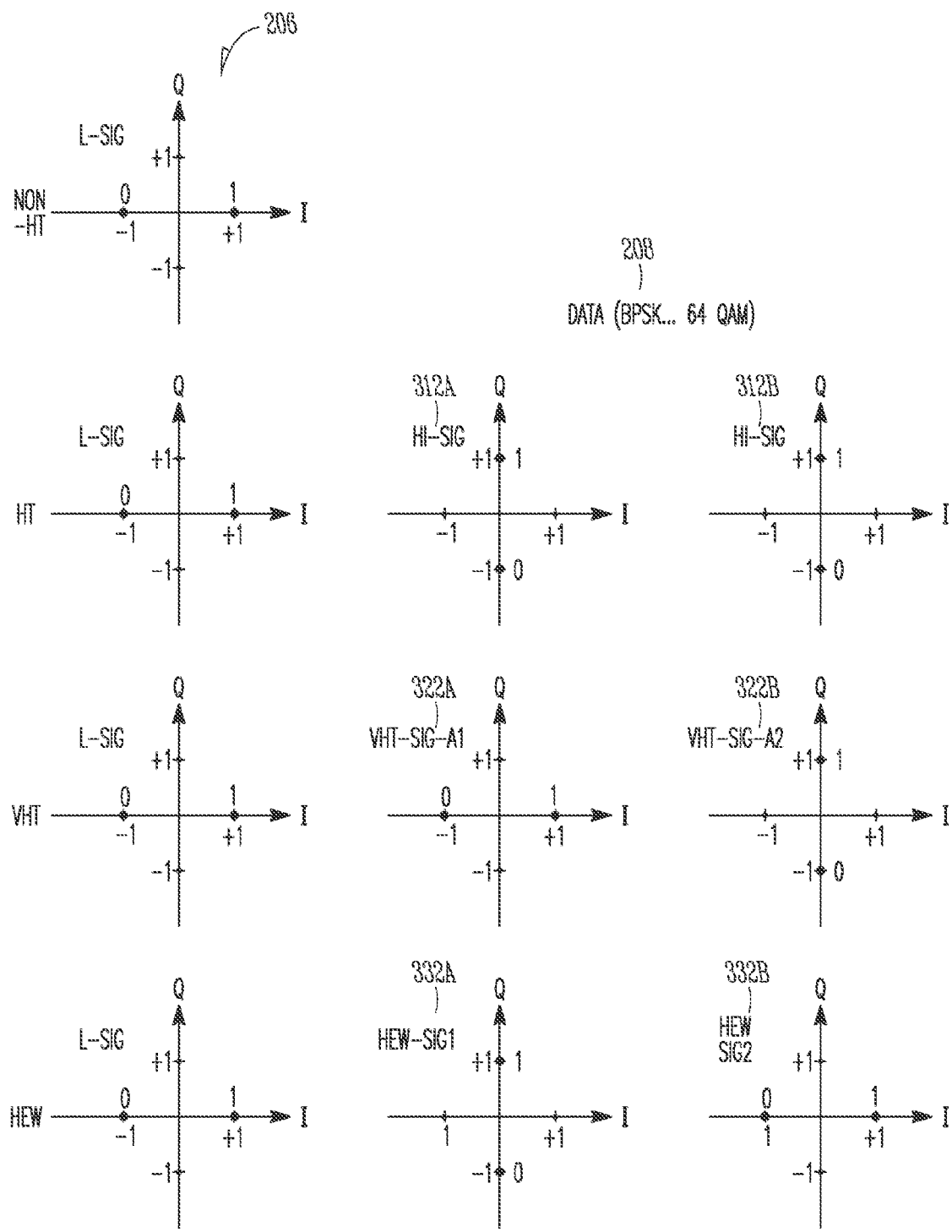
FIG. 3 illustrates signal field constellations in accordance with some embodiments.

FIG. 3 illustrates signal field constellations in accordance with some embodiments. As illustrated in FIG. 3, the L-SIG 206 for non-HT stations 108, for HT stations 110, for VHT stations 112 and for HEW stations 104 is illustrated with conventional BPSK modulation (i.e., no phase rotation is applied). As further illustrated in FIG. 3, a selected phase rotation for application to the BPSK modulation of the first and second symbols of the subsequent signal field 210 is shown.

In accordance with embodiments, for communicating with the HEW stations 104, the subsequent signal field 210 may be an HEW signal field (HEW-SIG) 232 (FIGS. 2D-2G) and the master station 102 may apply a ninety-degree phase rotation to the BPSK modulation of the first symbol 332A of the HEW-SIG 232 (i.e., rotated BPSK) and may refrain from applying a ninety-degree phase rotation to the BPSK modulation of the second symbol 332B of the HEW-SIG 232. Accordingly, for an HEW-PPDU, the first symbol 332A of the HEW-SIG 232 is rotated BPSK and the second symbol 332B is conventional (i.e., non-rotated) BPSK.

For communicating with VHT stations 112, the subsequent signal field 210 may be an VHT signal field (VHT-SIG) 222 (FIG. 2C) and the master station 102 may refrain from applying a ninety-degree phase rotation to the BPSK modulation of the first symbol 322A of the VHT-SIG 222 and may apply a ninety-degree phase rotation to the BPSK modulation of the second symbol 322B of the VHT-SIG 222. Accordingly, for a VHT-PPDU, the first symbol 322A of the VHT-SIG 222 is conventional BPSK and the second symbol 322B is rotated BPSK.

For communicating with HT stations 110, the subsequent signal field 210 may be an HT signal field (HT-SIG) 212 (FIG. 2B) and the master station 102 may apply a ninety-degree phase rotation to the BPSK modulation of both the first symbol 312A and the second symbol 312B of the HT-SIG 222. Accordingly, for a HT PPDU, both symbols of the HT-SIG 222 are rotated BPSK.

For communicating with non-HT stations 108, the access point may refrain from including the subsequent signal field 210 following the L-SIG 206. The data field 208 of a non-HT PPDU may have conventional (non-phase rotated) modulation (e.g., BPSK to 64 QAM) applied for all symbols allowing a non-HT PPDU to be identified and distinguished from other HT, VHT and HEW PPDUs.

In accordance with some embodiments, the phase rotation of the symbols in the subsequent signal field 210 may be used to distinguish an HEW PPDU from a non-HEW PPDU, such as a HT PPDU or a VHT PPDU. In these embodiments, it may not be necessary to use the length field of the L-SIG 206 to distinguish an HEW PPDU from a non-HEW PPDU and the length field may be set to a value that is divisible by three, although the scope of the embodiments is not limited in this respect. In some embodiments, the length field may also be used to distinguish an HEW PPDU from a non-HEW PPDU, such as a HT PPDU or a VHT PPDU.

In some embodiments, for communicating with the HEW stations 104 and some legacy stations 106 including HT stations 110 and VHT stations 112, the master station 102 may select a value for the rate field to cause the non-HT stations 108 to defer transmissions. In these embodiments, the non-HT stations 108 may correctly decode the L-SIG 206 but may be unable to correctly decode the remainder of the PPDU based on the indicated rate (or the cyclic-redundancy check (CRC) may fail) causing these stations to ignore the PPDU but defer based on the length indicated in the length field of the L-SIG 206. In these embodiments, a predetermined value (e.g., 5 or 6) may be selected for the rate field which may cause the non-HT stations 108 to defer their transmissions because of their inability to decode the subsequent fields.

Figure 4:
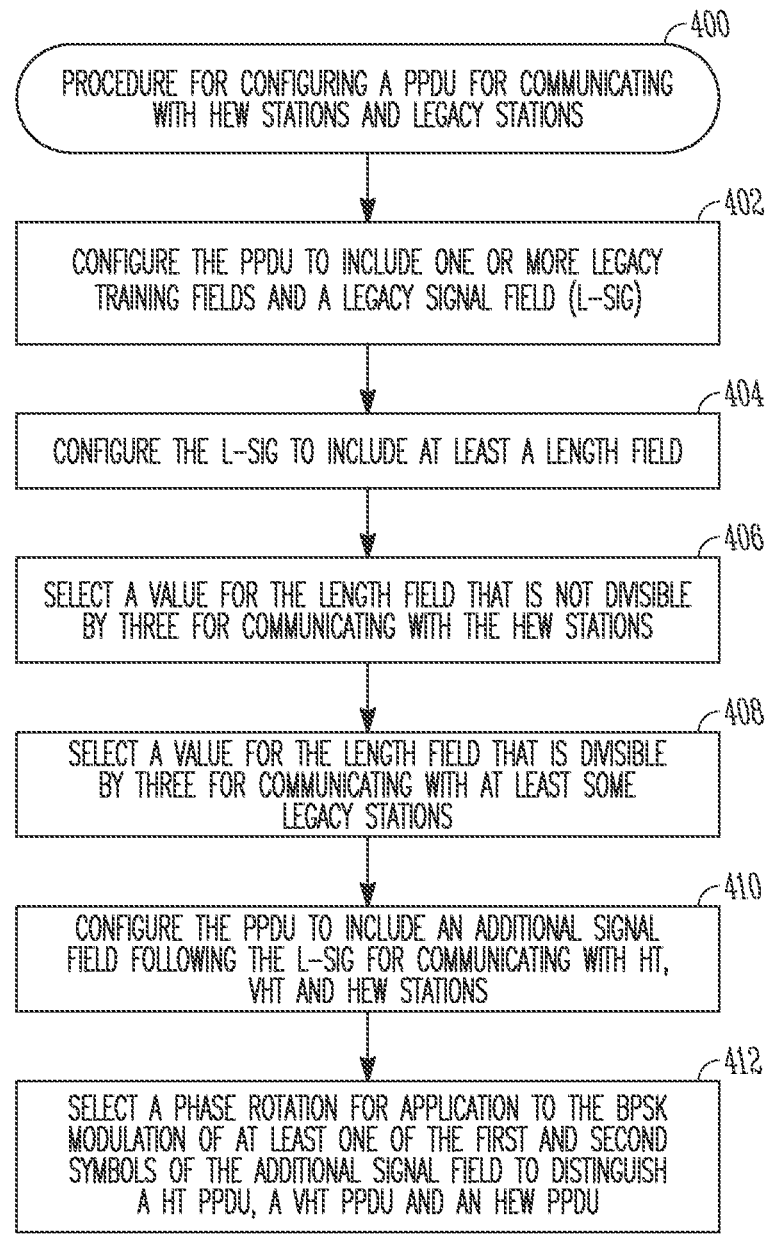
FIG. 4 is a procedure for configuring a PPDU for communicating with HEW stations and legacy stations in accordance with some embodiments.

FIG. 4 is a procedure for configuring a PPDU for communicating with HEW stations and legacy stations in accordance with some embodiments. Procedure 400 may be performed by an access point, such as master station 102 (FIG. 1), for communicating with HEW stations 104 (FIG. 1) as well as legacy stations 106 (FIG. 1).

In operation 402, a PPDU is configured to include one or more legacy training fields and a legacy signal field (L-SIG) 206 following the legacy training fields.

In operation 404, the L-SIG 206 is configured to include at least a length field.

In operation 406, a value for the length field that is not divisible by three is selected for communicating with the HEW stations 104.

In operation 408, a value for the length field that is divisible by three is selected for communicating with at least some legacy stations 106.

In operation 410, the PPDU is configured to include an additional signal field following the L-SIG 206.

In operation 412, a phase rotation is selected for application to the BPSK modulation of at least one of the first and second symbols of the additional signal field to distinguish a HT PPDU, a VHT PPDU and an HEW PPDU.

In some embodiments, operation 412 may be optional as the value selected for the length field in operations 406 and 408 may be used to distinguish HEW from non-HEW PPDUs. In some alternate embodiments, the value for the length field that is divisible by three is selected for communicating with all stations and the phase rotation of the symbols of the additional signal field may be used to distinguish a HT PPDU, a VHT PPDU and an HEW PPDU.

Figure 5:
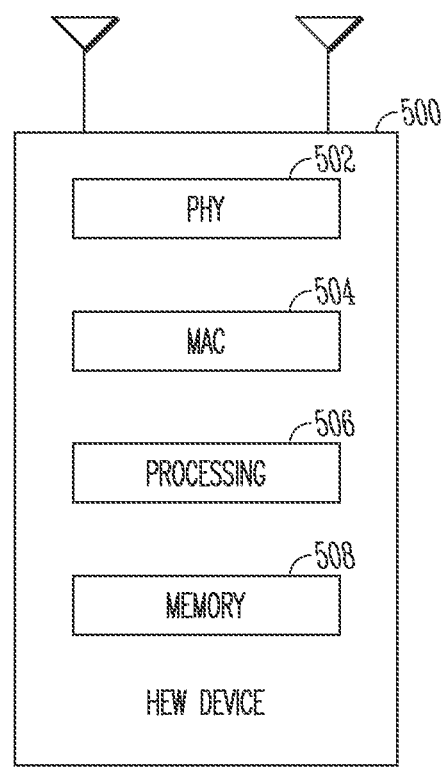
FIG. 5 is a block diagram of an HEW device in accordance with some embodiments.

FIG. 5 illustrates an HEW device in accordance with some embodiments. HEW device 500 may be an HEW compliant device that may be arranged to communicate with one or more other HEW devices, such as HEW stations 104 (FIG. 1) or master station 102 (FIG. 1) as well as communicate with legacy stations 106 (FIG. 1). HEW device 500 may be suitable for operating as master station 102 (FIG. 1) or an HEW station 104 (FIG. 1). In accordance with embodiments, HEW device 500 may include, among other things, physical layer (PHY) circuitry 502 and medium-access control layer circuitry (MAC) 504. PHY 502 and MAC 504 may be HEW compliant layers and may also be compliant with one or more legacy IEEE 802.11 standards. MAC 504 may be arranged to configure PPDUs in accordance with one or more of FIGS. 2A-2G and PHY 502 may be arranged to transmit and receive PPDUs, among other things. HEW device 500 may also include other hardware processing circuitry 506 and memory 508 configured to perform the various operations described herein.

In accordance with some embodiments, when operating as an HEW station 104, the HEW device 500 may be arranged to distinguish an HEW PPDU from a non-HEW PPDU based at least in part on a value in a length field in the L-SIG 206 (FIGS. 2A-2G). In these embodiments, the HEW device 500 may be configured to receive L-SIG 206 following legacy training fields (i.e., L-STF 202 and L-LTF 204). The L-SIG 206 may include the length field and a rate field. The HEW device 500 may determine whether a value for the length field is divisible by three and verify a parity bit of the L-SIG. The HEW device 500 may identify the PPDU as an HEW PPDU when the value in the length field is not divisible three and the parity bit is verified, and may identify the PPDU as a non-HEW PPDU (e.g., a VHT PPDU or HT PPDU) when the value in the length field is divisible three and the parity bit is verified. In some embodiments, the HEW device 500 may also be configured to decode subsequent fields of the PPDU when identified as an HEW PPDU and refrain from decoding subsequent fields of the PPDU when the PPDU is identified as a non-HEW PPDU.

In some embodiments, when operating as an HEW station 104, the HEW device 500 may be arranged to distinguish an HEW PPDU from a non-HEW PPDU based on the phase rotation of symbols of a subsequent signal field. In these embodiments, the HEW device 500 may be configured to receive an L-SIG 206 and receive a subsequent signal field 210 (HT-SIG 212, VHT-SIG 222, or HEW-SIG 232). The subsequent signal field 210 may have first and second symbols that are BPSK modulated. In these embodiments, the HEW device 500 may determine whether the PPDU is a HT PPDU, a VHT PPDU or an HEW PPDU based on the phase rotation applied to the BPSK modulation of at least one of the first and second symbols of the subsequent signal field 210. For an HEW PPDU, a ninety-degree phase rotation may have been applied to the BPSK modulation of the first symbol 332A and no phase rotation would have been applied to the BPSK modulation of the second symbol 332B of the subsequent signal field 210.

In accordance with some embodiments, the MAC 504 may be arranged to contend for a wireless medium during a contention period to receive control of the medium for the HEW control period and configure an HEW PPDU (e.g., FIG. 2D). The PHY 502 may be arranged to transmit the HEW PPDU as discussed above. The PHY 502 may include circuitry for modulation/demodulation, upconversion/downconversion, filtering, amplification, etc. In some embodiments, the hardware processing circuitry 506 may include one or more processors. In some embodiments, two or more antennas may be coupled to the PHY 502 and arranged for sending and receiving signals including transmission of the HEW packets. The memory 508 may be store information for configuring the other circuitry to perform operations for configuring and transmitting HEW packets and performing the various operations described herein.

In some embodiments, the HEW device 500 may be configured to communicate using OFDM communication signals over a multicarrier communication channel. In some embodiments, HEW device 500 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax standards and/or proposed specifications for WLANs, although the scope of the invention is not limited in this respect as they may also be suitable to transmit and/or receive communications in accordance with other techniques and standards.

In some embodiments, the HEW device 500 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the HEW device 500 may include one or more of a keyboard, a display, a non-volatile memory port, multiple antennas, a graphics processor, an application processor, speakers, and other mobile device elements. The display may be an LCD screen including a touch screen.

The antennas of the HEW device 500 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas may be effectively separated to take advantage of spatial diversity and the different channel characteristics that may result between each of antennas and the antennas of a transmitting station.

Although the HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the HEW device 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory;
   and processing circuitry coupled to the memory, the processing circuitry configured to:
   process a legacy preamble of a high-efficiency (HE) packet protocol data unit (HE-PPDU), the legacy preamble comprising a legacy signal field (L-SIG) following legacy training fields, the L-SIG including at least a length field and a rate field;
   process a subsequent signal field following the L-SIG, wherein first and second orthogonal frequency division multiplexing (OFDM) symbols immediately following the L-SIG use binary phase-shift keying (BPSK) modulation;
   determine whether the length field is divisible by three; and
   decode one or more subsequent fields following the subsequent signal field of the (HE-PPDU) based on a determination that the length field is not divisible by three, the one or more subsequent fields including a high-efficiency signal field (HE-SIG-A).

2. The apparatus of claim 1 wherein the subsequent signal field comprises a repetition of content of the L-SIG.

3. The apparatus of claim 2 wherein the one or more subsequent fields following the subsequent signal field of the HE-PPDU comprises the HE- SIG-A, wherein the processing circuitry is further configured to decode the HE-SIG- A, the HE-SIG-A comprising two OFDM symbols and follows the subsequent signal field, the HE-SIG-A to include common control information, and wherein STA is configurable to receive a duplicate of the HE-SIG-A on each of a plurality of 20 MHz subbands.

4. The apparatus of claim 3 wherein the HE-PPDU comprises a second high-efficiency signal field (HE-SIG-B) following the HE-SIG-A, wherein the HE-SIG-B comprises a variable number of OFDM symbols and configured to carry different content on each of the plurality of 20 MHz subbands, wherein the processing circuitry is further configured to decode the HE-SIG-B received on the 20 MHz subbands.

5. The apparatus of claim 2 wherein the processing circuitry is further configured to validate a parity bit of the L-SIG, the L-SIG having a valid parity bit for an HE-PPDU when the length field is not divisible by three.

6. The apparatus of claim 1 wherein the processing circuitry is further configured to:
based on a determination that the length field that is divisible by three, identify the PPDU as a non-HE PPDU.

7. The apparatus of claim 3 wherein the processing circuitry is further configured process:
a high-efficiency short training field (HE-STF) that follows the high-efficiency signal field; and
a number of high-efficiency long-training fields (HE-LTFs) that follow the HE-STF, the number of HE-LTFs based on a number of streams communicated by the HE-PPDU, and wherein the memory is configured to store information for use by the processing circuitry to decode the HE-PPDU.

8. The apparatus of claim 3 wherein the legacy preamble is duplicated on each of a plurality of subbands of HE-PPDU bandwidth, wherein the apparatus further comprises transceiver circuitry configured to receive at least some fields of the HE-PPDU on the plurality of 20 MHz subbands, wherein the transceiver circuitry is configurable to receive at least some fields of the HE-PPDU over bandwidths of 20 MHz, 40 MHz, 80 MHz or 160 MHz.

9. The apparatus of claim 8 wherein the processing circuitry is to configure the transceiver circuitry to:
receive the HE-PPDU during a transmission opportunity (TXOP) obtained by an HE access point, HE-PPDU being transmitted in accordance with a non-contention based scheduled orthogonal frequency division multiple access (OFDMA) technique in accordance with signaling information indicated in the high-efficiency signal field.

10. The apparatus of claim 9 further comprising two or more antennas coupled to the transceiver circuitry.

11. The apparatus of claim 1 wherein to determine whether the length field is divisible by three, the processing circuitry is configured to determine whether a value indicated by the length field is evenly divisible by three producing an integer result.

12. The apparatus of claim 1 wherein the processing circuitry is further configured to decode one or more subsequent fields immediately following the L-SIG based on a determination that the length field that is divisible by three, the one or more subsequent fields to be decoded as a legacy PPDU.

13. A non-transitory computer-readable storage medium that stores instructions for execution by processing circuitry of an apparatus of a communication station (STA) to configure the STA to perform operations to:
process a legacy preamble of a high-efficiency (HE) packet protocol data unit (HE-PPDU), the legacy preamble comprising a legacy signal field (L-SIG) following legacy training fields, the L-SIG including at least a length field and a rate field;
process a subsequent signal field following the L-SIG, wherein first and second orthogonal frequency division multiplexing (OFDM) symbols immediately following the L-SIG use binary phase-shift keying (BPSK) modulation;
determine whether the length field is divisible by three; and
decode one or more subsequent fields following the subsequent signal field of the HE-PPDU based on a determination that the length field is not divisible by three, the one or more subsequent fields including a high-efficiency signal field (HE-SIG-A).

14. The non-transitory computer-readable storage medium of claim 13 wherein the subsequent signal field comprises a repetition of content of the L-SIG.

15. The non-transitory computer-readable storage medium of claim 14 wherein the one or more subsequent fields following the subsequent signal field of the HE-PPDU comprises the HE-SIG-A, wherein the instructions further configure the processing circuitry to decode the HE-SIG-A, the HE-SIG-A comprising two OFDM symbols and follows the subsequent signal field, the HE-SIG-A to include common control information, and wherein STA is configurable to receive a duplicate of the HE-SIG-A on each of a plurality of 20 MHz subbands.

16. A method performed by an apparatus of a communication station (STA) comprising:
processing a legacy preamble of a high-efficiency (HE) packet protocol data unit (HE-PPDU), the legacy preamble comprising a legacy signal field (L-SIG) following legacy training fields, the L-SIG including at least a length field and a rate field;
processing a subsequent signal field following the L-SIG, wherein first and second orthogonal frequency division multiplexing (OFDM) symbols immediately following the L-SIG use binary phase-shift keying (BPSK) modulation;
determining whether the length field is divisible by three; and
decoding one or more subsequent fields following the subsequent signal field of the HE-PPDU based on a determination that the length field is not divisible by three, the one or more subsequent fields including a high-efficiency signal field (HE-SIG-A).

17. The method of claim 16 wherein the subsequent signal field comprises a repetition of content of the L-SIG.

18. The method of claim 17 wherein the one or more subsequent fields following the subsequent signal field of the HE-PPDU comprises the HE-SIG-A, wherein the method further comprises decoding the HE-SIG-A, the HE-SIG- A comprising two OFDM symbols and follows the subsequent signal field, the HE-SIG-A to include common control information, and wherein STA is configurable to receive a duplicate of the HE-SIG-A on each of a plurality of 20 MHz subbands.

19. An apparatus of access point (AP) arranged for communicating with a plurality of high-efficiency (HE) stations, the apparatus comprising: memory; and transceiver circuitry and processing circuitry coupled to the memory, the transceiver and processing circuitry configured to:
configure a HE packet protocol data unit (HE-PPDU) to include:
a legacy preamble comprising a legacy signal field (L-SIG) following legacy training fields, the L-SIG including at least a length field and a rate field;
a subsequent signal field following the L-SIG, wherein first and second orthogonal frequency division multiplexing (OFDM) symbols immediately following the L-SIG use binary phase-shift keying (BPSK) modulation; and
set a value for the length field that is not divisible by three for communicating with one or more of the HE stations, and transmit the HE-PPDU for receipt by one or more stations (STAs).

20. The apparatus of claim 19 wherein the subsequent signal field comprises a repetition of content of the L-SIG.

21. The apparatus of claim 20 wherein the legacy preamble is duplicated on each subband of HE PPDU bandwidth.

22. The apparatus of claim 21 wherein each subband of the HE-PPDU bandwidth comprises a 20 MHz subband, and wherein the HE-PPDU is configurable to for transmission over bandwidths of 20 MHz, 40 MHz, 80 MHz or 160 MHz.

23. The apparatus of claim 22 wherein the HE-PPDU is further configured to include a high-efficiency signal field (HE-SIG-A) comprising two OFDM symbols following the subsequent signal field, the HE-SIG-A duplicated on each 20 MHz subband, the HE-SIG-A and configured to include control information common to the subbands.

24. The apparatus of claim 23 wherein the HE-PPDU is further configured to include a second high-efficiency signal field (HE-SIG-B) comprising a variable number of OFDM symbols following the HE-SIG-A, the HE-SIG-B configured to carry different content on each subband of HE-PPDU bandwidth.

25. The apparatus of claim 20 wherein the processing circuitry is further configured to configure the L-SIG with a valid parity bit when the length field is selected to be not divisible by three.

26. The apparatus of claim 25 wherein the processing circuitry is further configured to:
set a value for a length field of a L-SIG of a non-HE-PPDU that is divisible by three for communicating with at least a legacy stations; and
configure the L-SIG of the non-HE-PPDU with a valid parity bit when the length field is selected to be divisible by three.

27. The apparatus of claim 23 wherein the HE-PPDU is further configured to include:
a high-efficiency short training field (HE-STF) to follow the high-efficiency signal field; and
a number of high-efficiency long-training fields (HE-LTFs) to follow the HE-STF, the number of HE-LTFs corresponding to a number of streams communicated by the HE-PPDU.

28. The apparatus of claim 27 wherein the processing circuitry is to configure the transceiver circuitry to:
contend for a wireless medium during a contention period to receive control of the medium for a transmission opportunity (TXOP) period; and
transmit the HE-PPDU during the TXOP to a plurality of scheduled HE stations in accordance with a non-contention based scheduled orthogonal frequency division multiple access (OFDMA) technique in accordance with signaling information indicated in the high-efficiency signal field.

* * * * *